US012686587B2

(12) United States Patent
Kadosh et al.

(10) Patent No.: US 12,686,587 B2
(45) Date of Patent: Jul. 21, 2026

(54) COLUMN GAP COVER SYSTEM

(71) Applicant: Mogogo Ltd, Tel Aviv (IL)

(72) Inventors: Yariv Kadosh, Tel Aviv (IL);
Mordehay Ben Aharon, Tel Aviv (IL);
Amit Kaufman, Borgata (IL)

( * ) Notice: Subject to any disclaimer, the term of this patent is extended or adjusted under 35 U.S.C. 154(b) by 108 days.

(21) Appl. No.: 18/944,015

(22) Filed: Nov. 12, 2024

(65) Prior Publication Data

US 2026/0131996 A1     May 14, 2026

(51) Int. Cl.
| | |
|---|---|
| *B65H 59/00* | (2006.01) |
| *B65H 23/26* | (2006.01) |
| *A01M 31/02* | (2006.01) |
| *B62B 5/00* | (2006.01) |
| *E01F 13/02* | (2006.01) |
| *E04H 17/02* | (2006.01) |

(52) U.S. Cl.
CPC ............. *B65H 59/00* (2013.01); *B65H 23/26* (2013.01); *A01M 31/025* (2013.01); *B62B 5/00* (2013.01); *B65H 2403/47* (2013.01); *E01F 13/022* (2013.01); *E04H 17/131* (2021.01)

(58) Field of Classification Search
CPC ..... E01F 13/022; E01F 13/02; A01M 31/025; E04H 15/005; E04H 17/131; E04H 17/1448; B65H 59/00; B65H 23/26; B65H 2403/47; B62B 5/00
USPC ....................................... 256/DIG. 1, 68, 67
See application file for complete search history.

(56) References Cited

U.S. PATENT DOCUMENTS

| | | | | | |
|---|---|---|---|---|---|
| 65,025 | A | * | 5/1867 | Thomas | E04H 17/055 256/DIG. 1 |
| 475,383 | A | * | 5/1892 | Cleaveland | E04H 17/131 256/42 |
| 485,304 | A | * | 11/1892 | Spillinger | E04H 17/133 256/DIG. 1 |
| 541,487 | A | * | 6/1895 | Little | E04H 17/055 256/45 |
| 543,890 | A | * | 8/1895 | Peck | E04H 17/08 256/DIG. 1 |
| 618,842 | A | * | 2/1899 | Cook | E04H 17/131 256/DIG. 1 |
| 666,560 | A | * | 1/1901 | Rowland | E04H 17/133 256/DIG. 1 |
| 680,342 | A | * | 8/1901 | Martin | E04H 12/2269 256/48 |

(Continued)

FOREIGN PATENT DOCUMENTS

| | | | | | |
|---|---|---|---|---|---|
| DE | 1957513 | A1 | * | 6/1970 | |
| GB | 647016 | A | * | 12/1950 | B62B 5/00 |

(Continued)

*Primary Examiner* — Phi D A

(57) ABSTRACT

A column gap cover system that includes right and left columns with toothed wheels intended to be fixed to a furniture, right and left ratchet clamps including a half-round clamp and a pawl connected together by a spring, and a sheet of fabric that its ends are connected to the clamps. The system is intended to cover a gap between the columns. The clamps are assembled on the columns and the pawls engage dips between the teeth of the toothed wheels, and the spring secure the pawls to the wheels, by that fastening the clamps to the columns. The clamps are manually rotatable on the columns, allowing the user to tension the sheet and engage the pawls in the appropriate dips to maintain the fabric in a taut state.

1 Claim, 3 Drawing Sheets

(56) References Cited

U.S. PATENT DOCUMENTS

| | | | | |
|---|---|---|---|---|
| 830,437 | A * | 9/1906 | Humphrey | E02B 3/106 |
| | | | | 405/113 |
| 929,853 | A * | 8/1909 | Hunt, Jr. | A47C 23/30 |
| | | | | 256/DIG. 1 |
| 975,470 | A * | 11/1910 | Shrady | E06B 9/52 |
| | | | | 160/354 |
| 1,175,109 | A * | 3/1916 | Anderson | E06B 9/52 |
| | | | | 160/372 |
| 2,619,101 | A * | 11/1952 | Mcgerry | E04H 15/003 |
| | | | | 135/117 |
| 3,366,298 | A * | 1/1968 | Bahrani | B65H 23/24 |
| | | | | 226/25 |
| 3,498,587 | A * | 3/1970 | Friedberg | E04H 15/005 |
| | | | | 5/99.1 |
| 3,537,688 | A * | 11/1970 | Stein | E04H 15/005 |
| | | | | 47/29.6 |
| 4,576,364 | A * | 3/1986 | O'Fearna | E04H 15/003 |
| | | | | 256/73 |
| 5,029,819 | A * | 7/1991 | Kane | E01F 13/028 |
| | | | | 160/24 |
| 5,531,258 | A * | 7/1996 | Poulson | F16B 7/105 |
| | | | | 256/DIG. 1 |
| 5,595,230 | A * | 1/1997 | Guerra | B08B 17/04 |
| | | | | 160/237 |
| 5,609,176 | A * | 3/1997 | Weeks | E04H 15/001 |
| | | | | 135/132 |
| 5,638,885 | A * | 6/1997 | Freese | E06B 9/02 |
| | | | | 160/369 |
| 5,865,355 | A * | 2/1999 | Camara | A45F 4/02 |
| | | | | 256/25 |
| 5,908,043 | A * | 6/1999 | Paes | E04B 1/92 |
| | | | | 135/117 |
| 6,092,792 | A * | 7/2000 | Camara | E04H 15/003 |
| | | | | 256/25 |
| 6,220,577 | B1 * | 4/2001 | Ostrow | E04G 21/3223 |
| | | | | 256/DIG. 1 |
| 6,386,519 | B1 * | 5/2002 | Priefert | E04H 17/1413 |
| | | | | 256/1 |
| 7,234,688 | B1 * | 6/2007 | Asenbauer | E04H 4/06 |
| | | | | 256/65.01 |
| 8,327,598 | B2 * | 12/2012 | Shew | H05K 7/1401 |
| | | | | 16/225 |
| 9,447,602 | B1 * | 9/2016 | Arias | E04H 15/003 |
| 10,151,334 | B1 * | 12/2018 | MacIlvane | E04H 17/26 |
| 10,604,960 | B1 * | 3/2020 | Hulsey | A01M 31/025 |
| 10,975,615 | B1 * | 4/2021 | Vega | E06B 9/24 |
| 11,224,197 | B1 * | 1/2022 | Williams | A01K 1/033 |
| 11,707,060 | B2 * | 7/2023 | Arkenau | E04H 15/001 |
| | | | | 135/141 |
| 12,146,338 | B1 * | 11/2024 | Li | E04H 17/18 |
| 12,158,018 | B2 * | 12/2024 | Smith | E04H 17/18 |
| 12,310,354 | B1 * | 5/2025 | Higdon | E04H 15/001 |
| 12,446,735 | B2 * | 10/2025 | O'Steen | A47K 3/34 |
| 2003/0006404 | A1 * | 1/2003 | Monaghan | E04H 17/131 |
| | | | | 256/37 |
| 2003/0122117 | A1 * | 7/2003 | Brown | E04G 21/3223 |
| | | | | 256/67 |
| 2004/0139925 | A1 * | 7/2004 | Young | E04H 17/1413 |
| | | | | 119/513 |
| 2004/0169172 | A1 * | 9/2004 | Stringer | E04H 17/1426 |
| | | | | 256/67 |
| 2004/0188667 | A1 * | 9/2004 | Ray | E04H 17/18 |
| | | | | 256/67 |
| 2007/0251561 | A1 * | 11/2007 | Lee | E04H 15/001 |
| | | | | 135/114 |
| 2014/0191177 | A1 * | 7/2014 | Bailie | E04F 11/1834 |
| | | | | 256/67 |
| 2016/0143453 | A1 * | 5/2016 | Shapiro | A47D 13/063 |
| | | | | 256/25 |
| 2017/0096833 | A1 * | 4/2017 | Colbeck | E04H 15/54 |
| 2018/0016839 | A1 * | 1/2018 | Jeong | E06B 9/08 |
| 2019/0112834 | A1 * | 4/2019 | Sinasac | E04H 17/18 |
| 2020/0024862 | A1 * | 1/2020 | Bianchi | E04H 15/003 |
| 2021/0115698 | A1 * | 4/2021 | Moore | E04H 17/1602 |
| 2021/0123260 | A1 * | 4/2021 | Thompson | E04H 17/18 |
| 2021/0156167 | A1 * | 5/2021 | Aspinwall | E04H 17/12 |
| 2022/0151407 | A1 * | 5/2022 | Novacek | E04H 15/005 |
| 2022/0361479 | A1 * | 11/2022 | Reed | A01M 31/025 |
| 2023/0137587 | A1 * | 5/2023 | Schilleman | E04H 17/1448 |
| | | | | 256/65.03 |
| 2024/0151060 | A1 * | 5/2024 | Wilson | E04H 15/54 |
| 2024/0175288 | A1 * | 5/2024 | Graham | A45F 3/24 |

FOREIGN PATENT DOCUMENTS

| | | | | |
|---|---|---|---|---|
| JP | H0583612 U | * | 11/1993 | |
| KR | 20200070664 A | * | 6/2020 | B65H 18/103 |

* cited by examiner

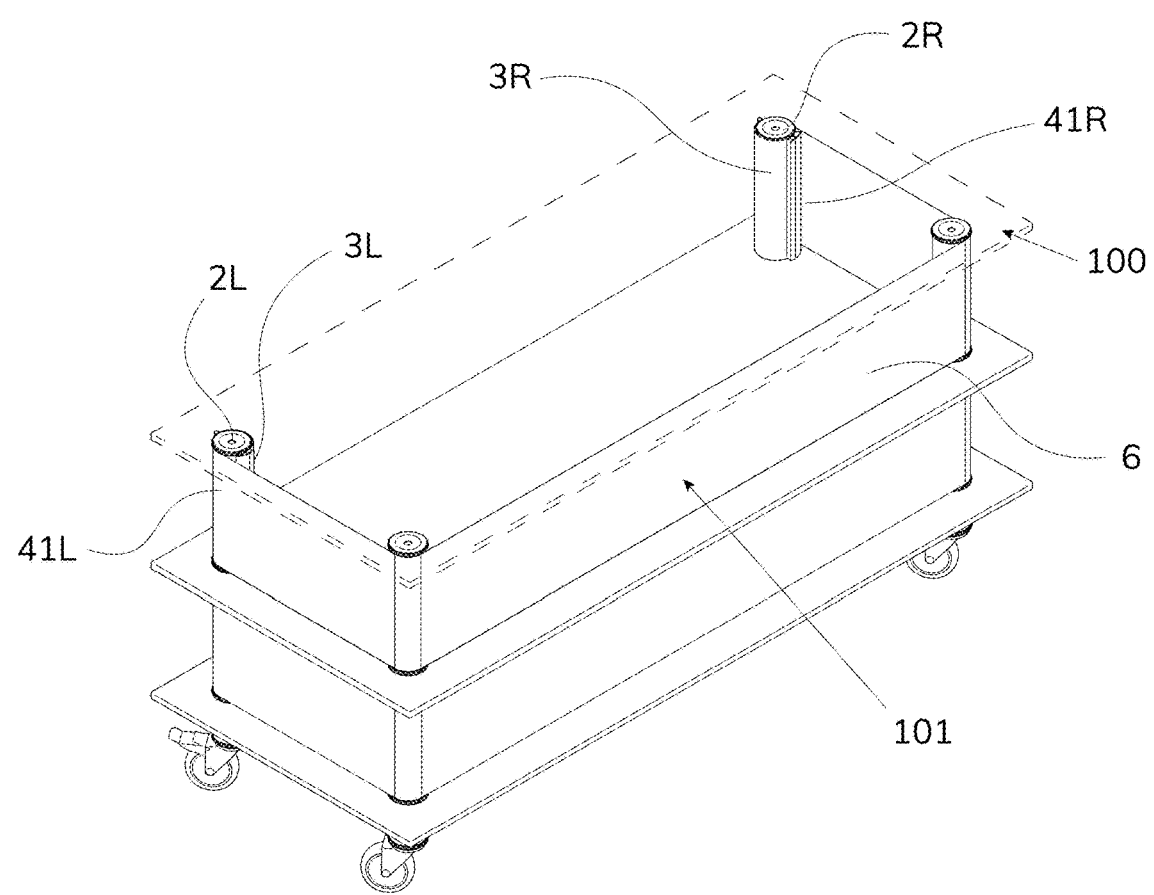
FIG 1
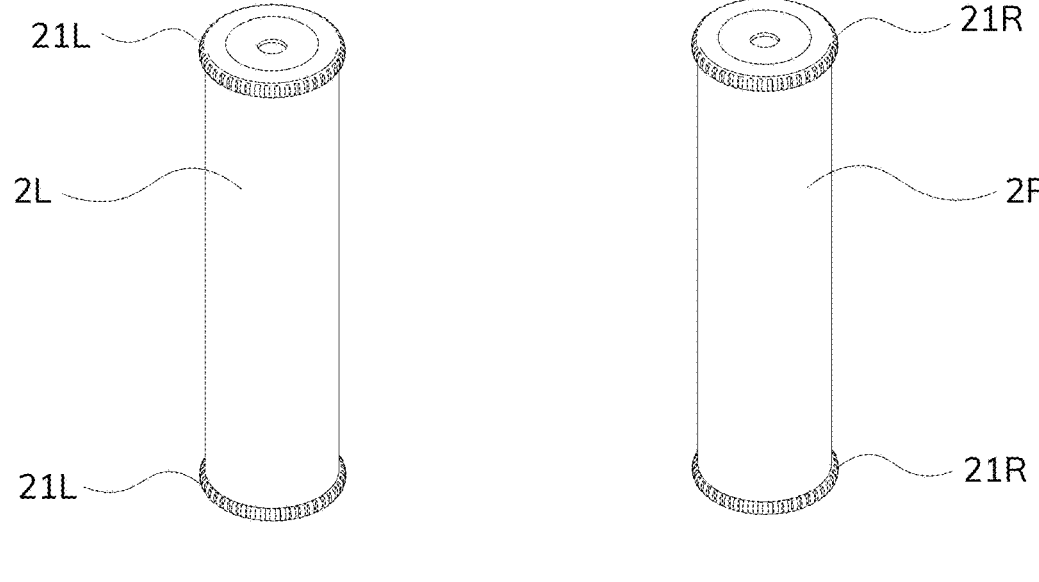
FIG 2A                                                    FIG 2B

3L

6

3R

6

2

3

6

3

2

6

COLUMN GAP COVER SYSTEM

TECHNICAL FIELD

The present invention relates to systems for covering space gaps between structural columns, such as those found on furniture, carts, or other setups for serving food or displaying items. Specifically, this invention pertains to a column gap cover system that allows a user to stretch a sheet of fabric between two columns, securely maintaining the fabric in a taut state to cover the gap.

BACKGROUND OF THE INVENTION

In various settings, such as in dining and event furniture setups, carts, and display units, gaps often exist between columns or structural supports. These gaps can be undesirable for aesthetic or functional reasons, as they may disrupt the visual flow of the setup or expose areas that users prefer to cover. Existing methods for bridging such gaps typically involve fixed panels or covers, which may lack adjustability and flexibility in different settings. Therefore, there is a need for an adaptable and adjustable system that provides a fabric cover to span gaps between columns, allowing for a smooth and stable appearance across various furniture arrangements.

SUMMARY OF THE INVENTION

The invention disclosed herein provides a column gap cover system that addresses the limitations of existing systems. The invention includes two columns, each having a toothed wheel, ratchet clamps with integrated pawls and leaf springs, and a sheet of fabric designed to cover the gap between the columns. The ratchet clamps can be manually rotated to position the pawls in suitable dips on the toothed wheels, thereby securing the fabric in a taut state across the gap.

DESCRIPTION OF THE DRAWINGS

The intention of the drawings attached to the application is not to limit the scope of the invention and its application. The drawings are intended only to illustrate the invention and they constitute only one of its many possible implementations.

FIG. 1 depicts the system (1) assembled on a piece of furniture (100).

FIGS. 2A and 2B depict the left and right columns (2L) and (2R).

DETAILED DESCRIPTION OF THE INVENTION

Description of the Components

Figure 3A:
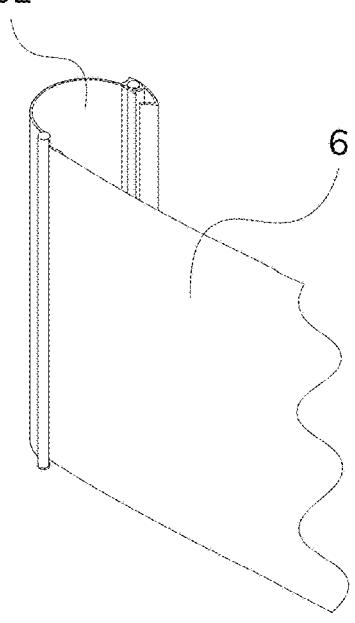
FIGS. 3A and 3B depict the left and right ratchet clamps (3L) and (3R).

The column gap cover system (1) comprises the following components:

A Right Column (2R): The right column is designed to be affixed to a piece of furniture, ceiling, floor, or other base structure (100). The right column includes one or more toothed wheels (21R) for engaging with the ratchet clamps, enabling secure placement and adjustable tensioning.

A Left Column (2L): Similar to the right column, the left column includes one or more toothed wheels (21L) and is configured to be attached to the same piece of furniture, ceiling, floor, or base. Together with the right column, this left column establishes the space where the gap cover will be positioned. The right and left columns can be the same and even identical, and the expressions right and left only come to illustrate that when used one is on the left side and the other on the right side of the space that the system is supposed to cover.

Right Ratchet Clamp (3R): The right ratchet clamp comprises a half-round clamp (31R) and a pawl (32R), connected by a spring (33R), can be a leaf spring or any other springy element. The half-round clamp is designed to attach to the toothed wheel on the right column. The leaf spring allows the pawl to engage with the teeth of the toothed wheel, enabling secure, adjustable positioning on the column.

Left Ratchet Clamp (3L): The left clamp is similar and may be identical in structure and function to the right ratchet clamp. It comprises a half-round clamp (31L) and a pawl (32L), connected by a spring (33L), can be a leaf spring or any other springy element, and is configured to attach to the toothed wheel on the left column.

Sheet of Fabric (4): The sheet of fabric is designed to span the gap (101) between the two columns. A right end (41R) of the sheet is connected to the half-round clamp on the right ratchet clamp, while the opposite left end (41L) is connected to the half-round clamp on the left ratchet clamp. The sheet of fabric may be made of an elastic or inelastic material suitable for achieving a taut state.

Operation of the Column Gap Cover System

In operation, a user can manually rotate the ratchet clamps around the columns to adjust the tension in the sheet of fabric. When the fabric covers the gap, the ratchet clamps allow the pawls to engage the toothed wheels in appropriate dips. This engagement holds the fabric in a taut state, effectively covering the gap.

Each ratchet clamp is positioned so that the pawl, under the force exerted by the leaf spring, fits securely into a dip between the teeth of the toothed wheel, ensuring that the clamp does not slip from the set position. The configuration of the clamps allows for easy adjustment by the user, who can rotate the clamps to achieve the desired tension in the fabric and then secure the pawls in the appropriate dips to maintain this tautness.

When performing the stretching operation of the sheet, the right ratchet clamp should be turned counterclockwise, while the left ratchet clamp should be turned clockwise, as illustrated in the drawings. The two ratchets can be identical, and only when assembling the system, turn one of them upside down and then it becomes opposite.

Advantages of the Invention

The column gap cover system offers a number of advantages:

Adjustability: The system allows users to vary the tension of the fabric to achieve the desired tautness.

Ease of Installation: The ratchet clamps and toothed wheels make it simple to secure the fabric between the columns without the need for additional tools.

Aesthetic and Functional Improvement: By covering gaps between columns, the system provides an enhanced appearance for carts, tables, or other setups, reducing visible gaps and creating a smooth, uniform appearance.

The invention disclosed provides a practical solution for covering gaps between structural columns. Its flexible design enables users to achieve the desired coverage and tension easily, making it suitable for various settings where aesthetic and functional gap coverage is required.

The sheet of fabric may be connected to the ratchet clamps in a variety of ways. For example, that the ends of the sheet of fabric (41R) (41L) will be sewn on two rods (42R) (42L), which can be inserted into two corresponding rails (34R) and (34L) on the clamps, as described for example in drawing number 8.

Figure 3B:
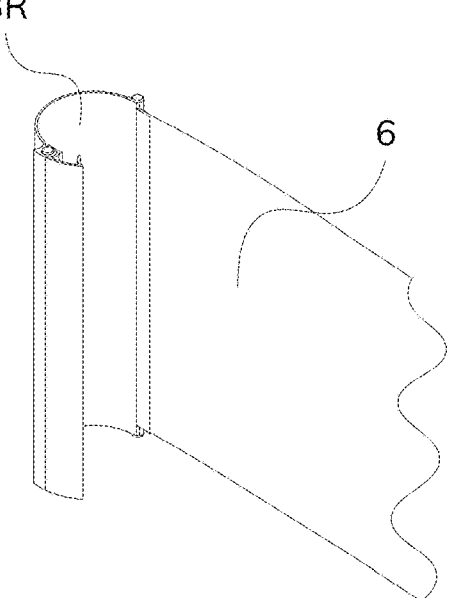
Figure 4:
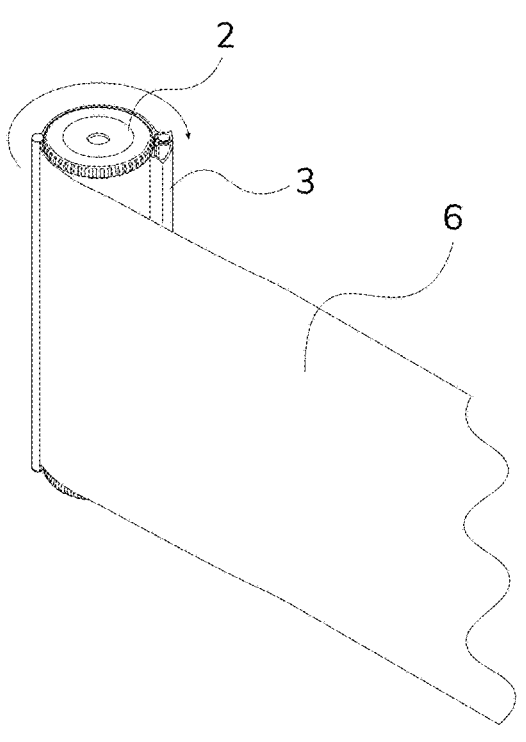
FIG. 4 is a perspective view of the left ratchet clamp with the sheet of fabric.
Figure 5:
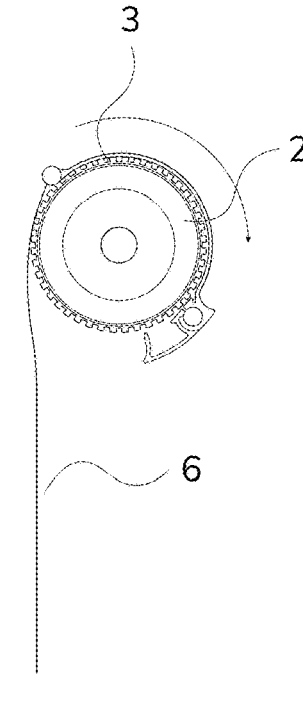
FIG. 5 is a top view of the left ratchet clamp.
Figure 6:
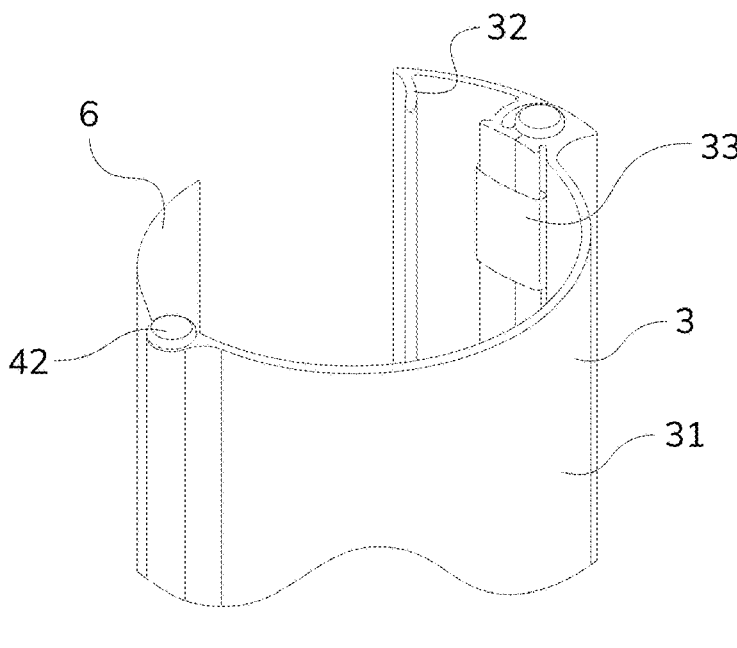
FIG. 6 is a perspective view of the left ratchet clamp.
Figure 7:
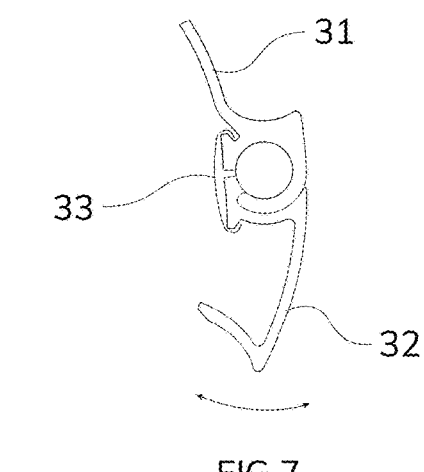
FIG. 7 depicts the leaf-spring in the ratchet clamp.
Figure 8:
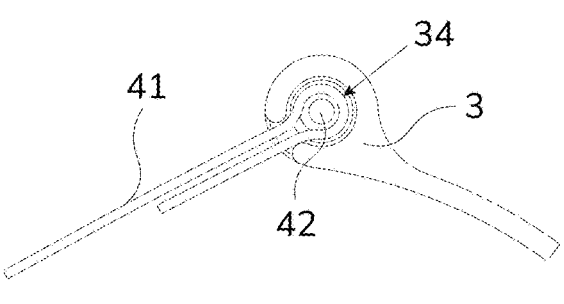
FIG. 8 depicts the way the sheet of fabric is connected to the ratchet clamp.

FIG. 1 depicts the system (1) assembled on a piece of furniture (100), FIGS. 2A and 2B depict the left and right columns (2L) and (2R), FIGS. 3A and 3B depict the left and right ratchet clamps (3L) and (3R), FIG. 4 is a perspective view of the left ratchet clamp with the sheet of fabric, FIG. 5 is a top view of the left ratchet clamp, FIG. 6 is a perspective view of the left ratchet clamp, FIG. 7 depicts the leaf-spring in the ratchet clamp, and FIG. 8 depicts the way the sheet of fabric is connected to the ratchet clamp. FIGS. 4-8 describe the parts of the left ratchet clamp that are the same as of the right one.

What is claimed is:

1. A column gap cover system, comprising:

a right column having one or more toothed wheels and configured to be fixed to a piece of furniture, a ceiling, a floor, or a base;

a left column having one or more toothed wheels and configured to be fixed to the piece of furniture, the ceiling, the floor, or the base;

a right ratchet clamp comprising a half-round clamp and a pawl, wherein the half-round clamp is connected to the pawl by a spring;

a left ratchet clamp comprising a half-round clamp and a pawl, wherein the half-round clamp is connected to the pawl by a spring;

a sheet of fabric, wherein a right end of the sheet is connected to the half-round clamp of the right ratchet clamp, and a left end of the sheet is connected to the half-round clamp of the left ratchet clamp;

wherein the column gap cover system is configured to cover a gap between the right column and the left column;

wherein each ratchet clamp is configured to be assembled on a respective column such that the pawl engages a dip between the teeth of the toothed wheel, while the spring exerting force to secure the pawl to the toothed wheel, thereby fastening the ratchet clamp to the column;

wherein the ratchet clamps are configured to be manually rotatable on the columns, allowing a user to tension the sheet of fabric and engage the pawl in an appropriate dip to maintain the fabric in a taut state.

* * * * *